US00RE38498E

(19) United States
(12) Reissued Patent
Ruth et al.

(10) Patent Number: US RE38,498 E
(45) Date of Reissued Patent: Apr. 20, 2004

(54) ONE-WAY CLUTCH APPARATUS

(75) Inventors: Stephen M. Ruth, Holly, MI (US); Brian D. Klecker, Richmond, VA (US); A. Richard Frank, West Bloomfield, MI (US)

(73) Assignee: Means Industries, Inc., Saginaw, MI (US)

( * ) Notice: This patent issued on a continued prosecution application filed under 37 CFR 1.53(d), and is subject to the twenty year patent term provisions of 35 U.S.C. 154(a)(2).

(21) Appl. No.: 09/238,403

(22) Filed: Jan. 28, 1999

(Under 37 CFR 1.47)

Related U.S. Patent Documents

Reissue of:
(64) Patent No.: 5,597,057
Issued: Jan. 28, 1997
Appl. No.: 08/382,070
Filed: Feb. 1, 1995

(51) Int. Cl.[7] ..... F16D 41/12
(52) U.S. Cl. ..... 192/46; 192/45.1; 192/71; 74/577 R; 188/82.8
(58) Field of Search ..... 192/46, 71, 43.1, 192/45.1; 188/82.7, 82.8; 74/575, 577 R

(56) References Cited

U.S. PATENT DOCUMENTS 1,163,298 A * 12/1915 Winkler
2,226,247 A * 12/1940 Lesage
2,323,353 A * 7/1943 Plog
3,461,746 A * 8/1969 Schwerdhöfer
3,511,348 A * 5/1970 Jonsson et al.
3,532,198 A * 10/1970 Lederman
3,844,391 A * 10/1974 Hallerberg
3,938,632 A * 2/1976 Giese et al.
3,997,041 A * 12/1976 Judd et al.
4,049,099 A * 9/1977 Zeigler
4,119,310 A * 10/1978 Trubody
4,187,728 A * 2/1980 Mazzorana
4,363,390 A * 12/1982 Eisend et al.
4,437,553 A * 3/1984 Geisthoff
4,548,304 A * 10/1985 Nagata (List continued on next page.)

FOREIGN PATENT DOCUMENTS

GB 866978 * 5/1961
GB 869052 * 5/1961
GB 1598908 * 9/1981

*Primary Examiner*—Charles A. Marmor
*Assistant Examiner*—Saul Rodriguez
(74) *Attorney, Agent, or Firm*—Brooks Kushman P.C.

(57) ABSTRACT

A one-way clutch apparatus comprising a driving member having a plurality of recesses, a corresponding plurality of biasing members disposed in the recess, a corresponding number of keys or struts disposed over the biasing members in the recesses, and a driven member having a plurality of key-engaging notches formed circumferentially about an inside surface. Each of the keys includes a pair of laterally protruding arm portions and each of the arm portions has a ramp formed thereon which acts as a relief to allow the inside surface of the driven member to be placed to close proximate relationship with the inside surface of a driving member and to overlay portions of the recess. The overlaying enables the driven member to damp or otherwise limit the movement of a back end portion of each key when the driving member is moved in either a free-wheeling direction or driving direction, while the ramp portions allow a front end portion of the key to be urged outwardly without any portion of the arm portion interfering with the inside surface of the driven member overlaying portions of each recess. The one-way clutch apparatus is not as dependent upon a copious and continuous supply of lubricant to damp unwanted movement of the key as prior art developed one-way clutch systems.

15 Claims, 6 Drawing Sheets

U.S. PATENT DOCUMENTS 4,635,502 A * 1/1987 George
4,711,331 A * 12/1987 Hoffmann
4,788,874 A * 12/1988 Nelson et al.
5,004,083 A * 4/1991 Lohman
5,024,308 A * 6/1991 Kinoshita et al.
5,054,594 A * 10/1991 Kämpf et al.
5,070,978 A * 12/1991 Pires

* cited by examiner

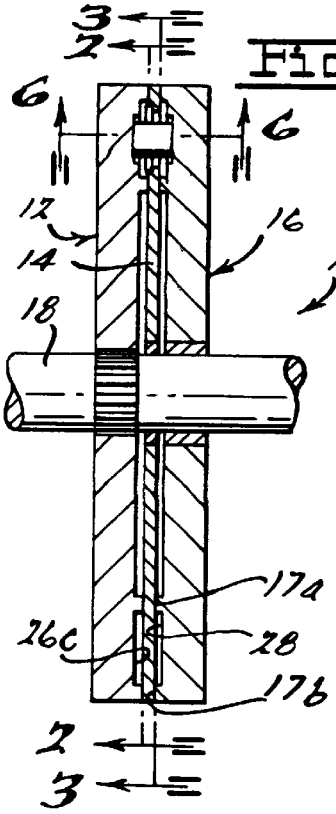
FIG. 1.
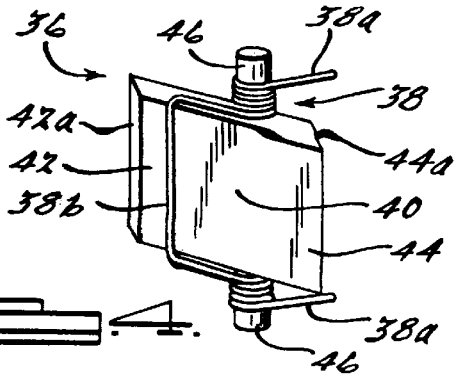
FIG. 4.
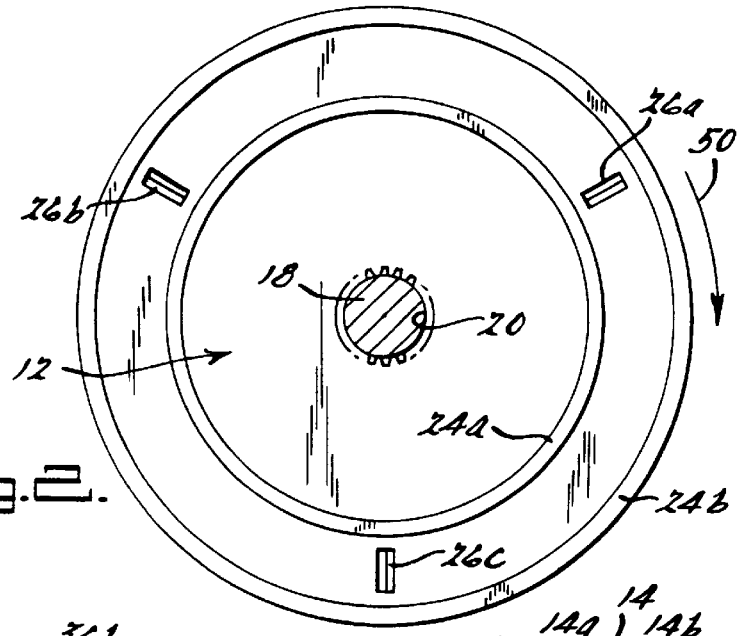
FIG. 2.
FIG. 3.
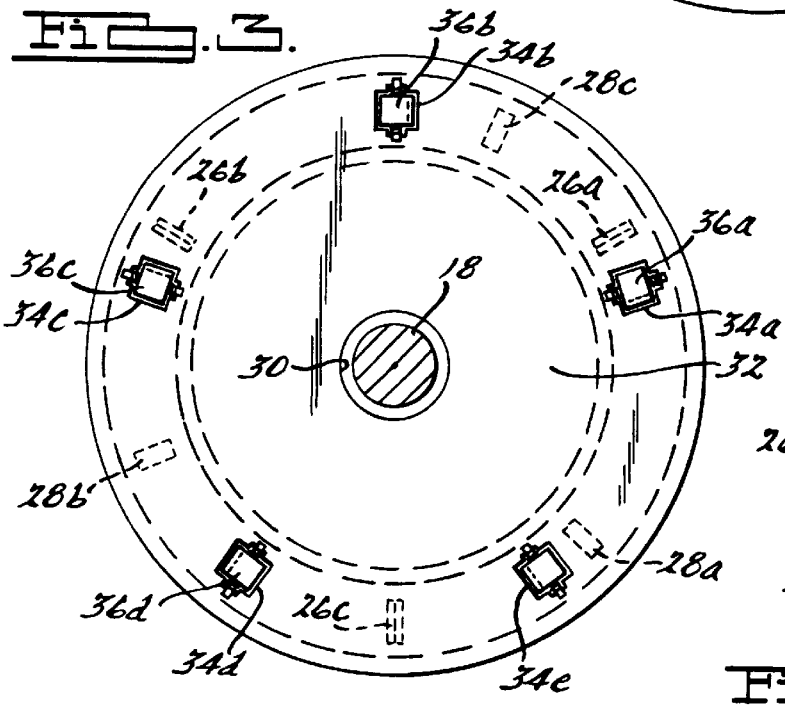
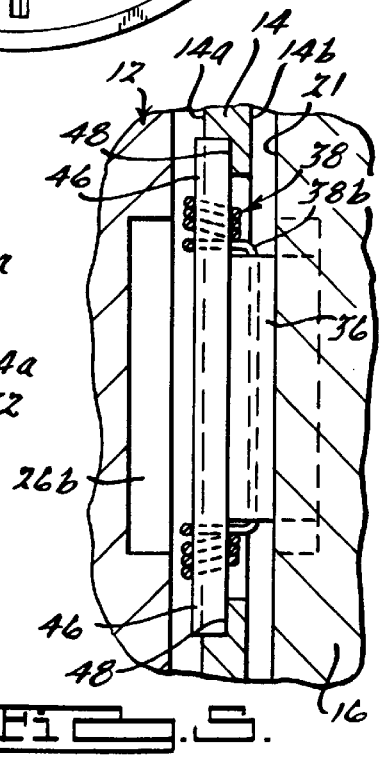
FIG. 5.

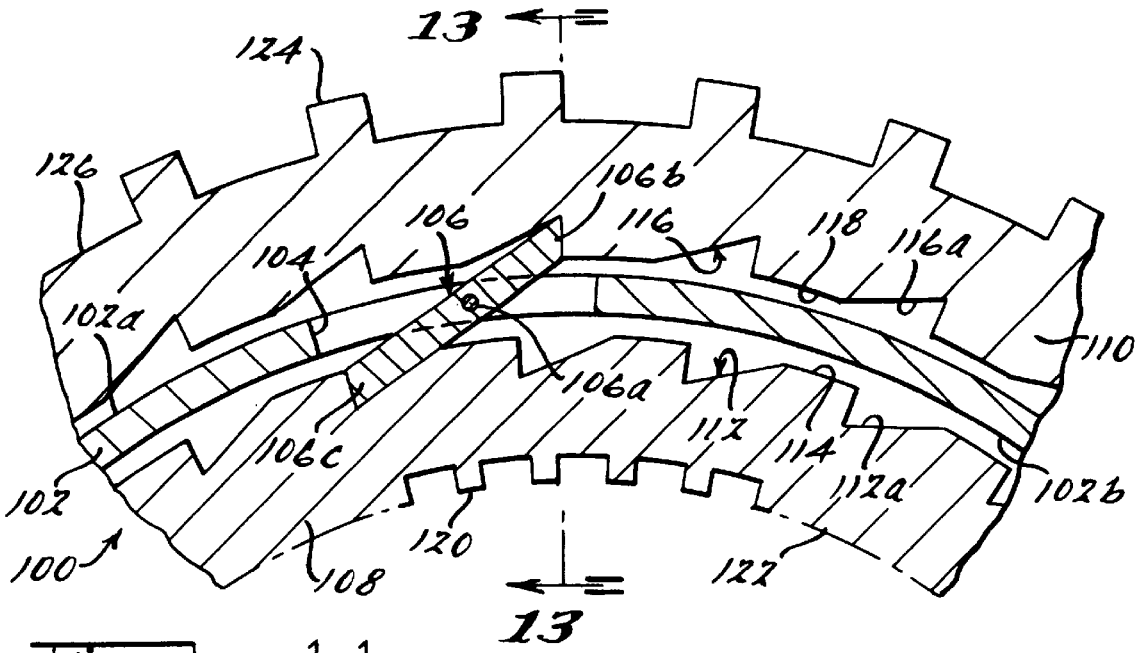
FIG. 11.
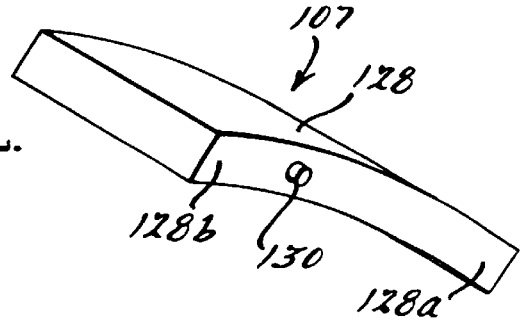
FIG. 12.
FIG. 13.
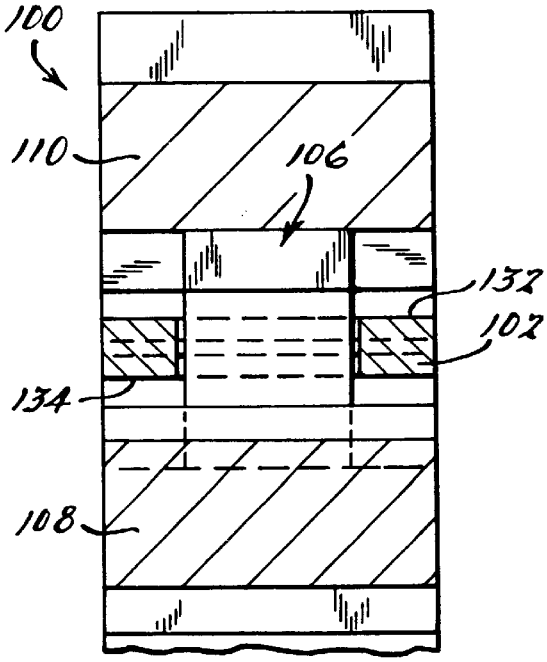
FIG. 14.
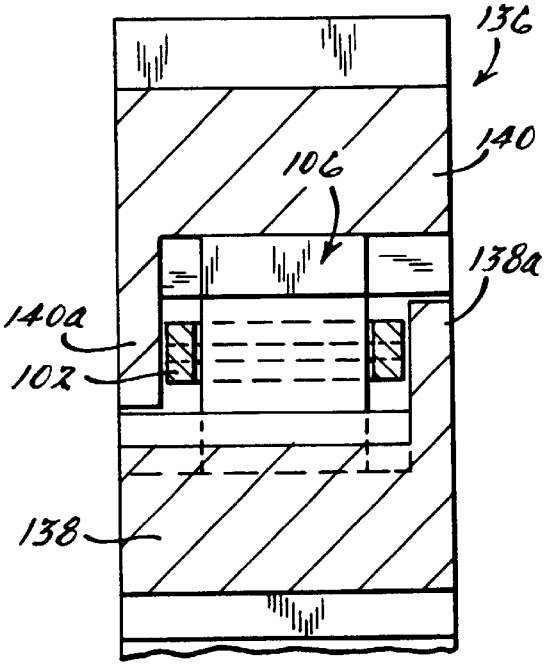

ONE-WAY CLUTCH APPARATUS

Matter enclosed in heavy brackets [ ] appears in the original patent but forms no part of this reissue specification; matter printed in italics indicates the additions made by reissue.

[WITH CROSS REFERENCE TO RELATED APPLICATION]

[This application is a continuation-in-part application of U.S. application Ser. No. 08/179,105, filed Jan. 10, 1994, which issued as U.S. Pat. No. 5,449,057 on Sep. 12, 1995, which is in turn a continuation-in-part application of U.S. application Ser. No. 08/143,485, filed Oct. 26, 1993 and presently abandoned.]

TECHNICAL FIELD

This invention relates to clutches, and more particularly to a one-way clutch apparatus.

DISCUSSION

Clutches are used in a wide variety of applications to selectively couple power from an input member, such as a driving disk or plate, to a second independently rotatable member such as a driven plate or disk. In some applications, it is further desirable to incorporate a clutch which allows for rotational movement of the driving member in a second rotational direction in which no clutch engagement occurs, and therefore in which no rotation of the driven member occurs. Such clutches are commonly referred to as "one-way" clutches. With a one-way clutch, when a driving member is rotated in a first direction, the clutch causes engagement of the driving member with an external driven member. When the driving member is rotated in a second rotational direction opposite to that of the first rotational direction, the clutch releases the driven member from engagement with the driving member. The driving member is then allowed to rotate ("over-run") freely or to "free wheel" relative to the driven member.

Previously designed one-way clutches typically include some form of "strut" which is positioned in a notch formed in either the driving member or the driven member. The strut typically "floats" in the notch during operation. While this design has proven to be a success and to work satisfactorily in many applications, it would nevertheless be even more desirable to provide a one-way clutch having some form of strut-like member which is more positively supported, and which does not "float" with respect to its supporting plate, but rather which "rotates" between engaged and disengaged positions relative to its supporting plate. Such an apparatus would be even more stable at higher rmp applications such as those in connection with transmissions being used with aircraft engines.

Yet another area where even further improvements over previously designed one-way clutches would be desirable is in connection with providing a strut-like engaging element for a one-way clutch which is not as critically dependent upon a copious amount of lubricant, such as oil, for proper operation. With previously designed one way clutches it is critically important that the pockets in the plate within which the strut is disposed be very well lubricated. This lubrication requirement becomes more difficult to satisfy as the transmission or other apparatus within which the one-way clutch is disposed is oriented in different angles, such as when a vehicle or aircraft associated with the transmission incorporating the one-way clutch changes its attitude relative to the earth's surface. In such instances there may be momentary lapses of lubrication to the notches wherein the struts are housed. These lapses, in some extreme instances, could adversely impact the wear of the one-way clutch.

Still another area where even further improvement over previously designed one-way clutches could be achieved is the design of the strut or "key" which engages with the driven member when the clutch is rotated in one direction and disengages to allow free-wheeling when the driving member is rotated in a second direction opposite to the first direction. In some clutch designs the key rests within a recess or relief of a driving member and has one end thereof biased outwardly by a biasing member such as a spring. Since the key is not physically pivotally secured to the member upon which it rests, the entire key is free to "lift", sometimes to a relatively large degree, which in turn might cause undesirable wear in the driven member positioned closely adjacent the key. Such wear might occur if, for example, the back end of the key (i.e., the end opposite to that which engages the driven member) lifts significantly to contact a surface of the driven member when the driven member is being rotated in a free-wheeling direction. Accordingly, it would be preferable to include some surface on the driven member which limits the lifting of the back end of the key to a very small degree even when the driving member is being rotated in a free-wheeling direction.

Yet another area where it would be desirable to reduce the wear-and-tear of a key of a one-way clutch apparatus would be in the design of the arm portions of the strut. At present, when the key is disposed on a driving member, a relatively large degree of clearance between the key and the driven member is required so that the arm portions of the key do not interfere with a surface of the driven member when the key is engaging a notch of the driven member. Thus, if the driven member is designed such that portions of a surface thereof limit the travel of the back end of the key, then the shape of the key arms becomes extremely important in allowing the key to pivot fully and engage the driven member without interfering with a surface of the driven member as the key engages therewith.

Accordingly, it is a principal object of the present invention to provide a one-way clutch apparatus which is adapted to couple a driving member with a driven member when the driving member is moved in a first rotational direction, and to allow the driving member to be moved freely relative to the driven member when the driving member is moved in a second rotational direction.

It is yet another object of the present invention to provide a one-way clutch having an engaging element which does not "float" in a related supporting member but is instead more positively supported for rotational movement relative to its supporting member, and which therefore is more stable in higher rpm applications.

It is yet another object of the present invention to provide a one-way clutch apparatus which is more immune to undesirable operating characteristics caused by a temporary lack of lubricant to the areas adjacent its engaging element, to thereby permit the one-way clutch to be used in applications where a transmission within which it is operating can be operated in a variety of attitudes relative to the earth's surface without fear of a momentary lack of lubricant to the one-way clutch adversely affecting the wear and tear on the one-way clutch.

It is still another object of the present invention to provide a one-way clutch apparatus which is adapted for use with concentrically disposed inner and outer annular ring members such as annular gears to allow one of the concentrically disposed gears to drive the other when rotated in a first direction and to allow the two concentrically disposed gears to be uncoupled from one another when the former gear is driven in an over-running direction.

It is yet another object of the present invention to provide a one-way clutch apparatus in which portions of a surface of a driven member are used to limit movement of a back end portion of a key or strut disposed on a driving member when the driving member is rotated in a free-wheeling direction relative to the driven member.

It is still another object of the present invention to provide a one-way clutch apparatus in which portion of the surfaces of a driven member are used to restrict movement of a back end of a strut or key disposed on a driving member, and where a pair of arm portions about which the strut or key pivots are shaped such that the arm portions do not interfere with the surface portions of the driven member when the strut is engaging the driven member. In this manner, an automatic degree of "damping" would be provided to the key or strut by the close proximate relation of various surface portions of the driven member which would limit undesirable lifting or other movement of the back end of the key or strut while the driving member is rotated in a free-wheeling direction.

SUMMARY OF THE INVENTION

The above and other objects are provided by a one-way clutch apparatus in accordance with preferred embodiments of the present invention. The apparatus generally includes a carrier plate having a cut-out portion and an engaging element in the form of a key supported within the cut-out portion for pivotal or rotational movement about a central axis of the key. Biasing means is further included for biasing the key such that first and second ends of the key are continuously urged outwardly of the carrier plate.

In the preferred embodiment the carrier plate is used in connection with a driving member having a key engaging portion formed in a surface thereof which faces the carrier plate, and with a driven member having a key engaging portion in a surface thereof which also faces the carrier plate. Accordingly, the carrier plate is disposed generally parallel between the driving and driven members. The key engaging portions of each of the driven and driving members are further disposed the same distance away from the axis of rotation of each of the members, and further the same distance from the axis of rotation as the key is disposed from the axis of rotation of the carrier plate. Accordingly, at some time during rotation of the driving member the key engaging portion therein will move directly over the key of the carrier plate. Since the carrier plate, driving member and driven member each rotate about a common axis, as the key in the carrier plate rotates it will at some time position itself over the key engaging portion of the driven member.

When the driving member is rotated in a first rotational direction, at some point during rotational movement thereof the key engaging portion moves directly over the key in the carrier plate. A first end portion of the key is urged into engagement with the key engaging portion in the driving member by the force of the biasing means, which in the preferred embodiment is in the form of a coil spring operably associated with the key. Engagement of the first end portion of the key in the key engaging portion of the driving member causes the carrier plate to begin moving rotationally with the driving member in the first rotational direction. As the key (and carrier plate) is moved rotationally to a position over the key engaging portion of the driven member the biasing force of the spring causes further rotational movement of the key itself such that a second end portion of the key engages or "drops into" engagement with the key engaging portion in the driven member. The driving member, carrier plate and driven member then all rotate in the first rotational direction with the key positively coupling the driving action of the driving member to the driven member.

When the driving member is moved in a second rotational direction opposite to that of the first rotational direction, the first end portion of the key will be urged rotationally out of engagement with the key engaging portion of the driving member. The driving member is then allowed to over-run (i.e., rotate freely) in the second rotational direction without driving engagement with the key, and therefore without engagement with the driven member. Thus, the driving member can "free wheel" in the second rotational direction while the carrier plate and driven member remain stationary, or relatively stationary.

In an alternative preferred embodiment of the present invention the carrier plate is in the form of a carrier ring which is interposed concentrically between an inner annular ring and an outer annular ring. The carrier ring includes at least one cut-out portion within which a key is disposed for pivotal movement therein. Each of the inner and outer rings include at least one notched portion therein which is adapted to engage one or the other of the ends of the key.

When the outer ring, for example, is rotating in an over-running direction the key does not engage with the notch therein. Accordingly, rotation of the outer ring and the over-running direction does not impart any driving action to either the carrier ring or the inner ring. However, when the outer ring, for example, is rotated in the rotational direction opposite to that of the over-running direction, the key in the carrier is caused to engage the notch in the outer ring. As this occurs the carrier ring is driven rotationally concurrently with the outer ring for at least a short distance before engaging the notch in the inner ring. At this point the key transmits the full driving force of the outer ring to the inner ring thus causing the inner ring to rotate concurrently with the outer ring. It will be appreciated that the inner ring could just as easily be used as the driving ring in the outer ring as the driven ring. The principles of operation of the present invention are not dependent upon which of the inner or outer rings are used at the driving or driven ring.

The alternative embodiment just described above thus allows two concentrically disposed ring members such as annular gears to be driven together when one or the other is driven in one direction, and to be drivingly uncoupled when one or the other is rotated in the opposite rotational direction.

In the alternative embodiment described above the key may be spring biased such that its outermost ends extend slightly outwardly of the inner and outer surfaces of the carrier ring. Alternatively, the key may be formed such that its axis of pivotal movement is off center towards one of the outermost ends. This causes one of the outermost ends to be urged outwardly by a centrifugal force as the carrier ring rotates in one direction, and allows gravity to urge one of the ends outwardly of the carrier ring when the carrier ring is substantially stationary. Thus, the need for some independent biasing means such as a spring is obviated.

In yet another alternative preferred embodiment of the present invention a one-way clutch apparatus is disclosed in which portions of a surface of the driven member are formed so as to overlap portions of the pivot arms of a key or strut which is disposed on a surface of a driving member. The portions of the surface of the driven member which overlap portions of the arms of the key or strut positively limit the degree of movement of a back end portion of the key, such that the back end portion cannot rise significantly while the driving member is rotated in a free-wheeling direction.

To allow the above-described close placement of portions of the surface of the driven member relative to the arms of the key, the arms of the key are formed with ramp portions thereon to provide a degree of relief to the arm portions. This degree of relief enables a front end portion of the key to be urged outwardly by a biasing member, such as a spring, and to engage a recess in the driven member when the driving member is rotated in a driving direction (i.e., a direction wherein the key will engage the driven member and drive the driven member rotatably therewith). The ramp portions formed on the arms of the key provide the needed clearance between the arm portions and the portions of the surface of the driven member which would otherwise interfere with the movement of the key or enough for the ramp portions. The ramp portions formed on the arms of the key thus allow the key to be rotated a sufficient degree to engage a driven member without interfering with one or more surface portions of the driven member disposed closely adjacent the driving member, which limits the movement of the back end portion of the key. In this manner, the key is "damped" by the closely positioned surface portions of the driven member. This enables the key to operate in a clutch being driven at a very high rpm, such as 5000 rpm or above. This arrangement further provides a means by which undesirable movement of the key can be "damped" without completely flooding the areas adjacent the key with a lubricating fluid. Thus, the clutch apparatus is even less dependent upon a copious and continuous supply of lubrication to the key and the surface areas which it engages during driving operation.

Other objects, advantages and features of the present invention will become apparent to one skilled in the art upon reading the following description and dependent claims, taken in conjunction with the following drawings.

BRIEF DESCRIPTION OF THE DRAWINGS

The various advantages of the present invention will become apparent to one skilled in the art by reading the following specification and subjoined claims and by referencing the following drawings in which:

FIG. 1, is a cross-sectional side view of a one-way clutch in accordance with a preferred embodiment of the present invention showing the apparatus coupled to a drive shaft adapted to supply a "motive" or driving power to a driving member of the apparatus;

FIG. 2 is a view of the driving member taken in accordance with section line 2—2 in FIG. 1;

FIG. 3 is a view of the carrier plate taken in accordance with section line 3—3 in FIG. 1;

FIG. 4 is an elevational perspective view of the key and coil spring of the one-way clutch of the present invention;

FIG. 5 is a cross-sectional view of the apparatus taken in accordance with section line 5—5 in FIG. 9;

FIG. 11 is a fragmentary cross sectional view of an alternative preferred embodiment of the present invention showing the carrier member in the form of a carrier ring disposed concentrically between concentrically disposed inner and outer races;

FIG. 12 is a perspective view of an alternative preferred form of the key shown in FIG. 11;

FIG. 13 is a cross sectional view of the assembly shown in FIG. 11 in accordance with section line 13—13 therein;

FIG. 14 is a view of an alternative preferred form for the inner and outer races of FIG. 13.

DETAILED DESCRIPTION OF THE PREFERRED EMBODIMENTS

Figure 6:
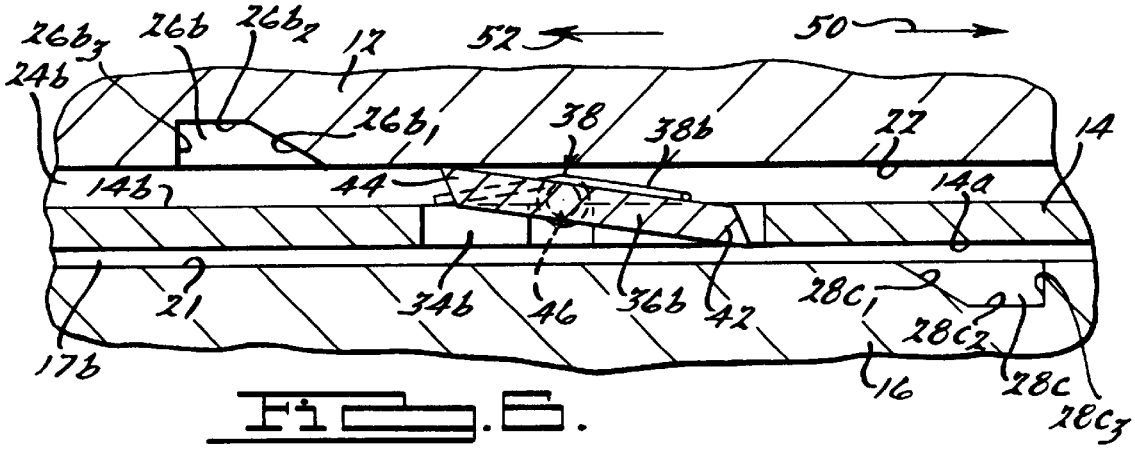
FIG. 6 is a view of the apparatus in accordance with section line 6—6 in FIG. 1, showing one key of the carrier plate disengaged with both the driving member and the driven member.

Referring to FIG. 1, there is shown a one-way clutch apparatus 10 in accordance with a preferred embodiment of the present invention. The apparatus 10 generally includes a driving member 12 in the form of a drive plate or disk, a carrier plate 14 in the form of a plate or disc, and a driven member 16 in the form of a driven plate or disk. For purposes of illustration, the driving plate 12 is shown splined to a drive shaft 18 such that rotational movement of the drive shaft 18 causes a corresponding rotational movement of the driving member 12. Also for purposes of illustration, the carrier plate 14 and driven member 16 are shown concentrically disposed about the drive shaft 18 such that each is free to remain stationary when the one-way clutch 10 is not engaged. It will be appreciated that the driving member 12 and driven member 16 could just as easily be switched such that member 16 imparts a motive force to member 12. Furthermore, it should be appreciated that one or the other of the members 12 and 16 could be a stationary component within a transmission or other like mechanism and that applications will be readily recognized by those of ordinary skill in the art which involve minor variations of the embodiment illustrated in the drawings herein, but which still clearly fall within the scope of the appended claims.

With brief reference to FIG. 2, the driving member 12 is illustrated. The driving member 12 generally includes an aperture 20 which as shown may include a plurality of teeth for engaging the splined drive shaft 18. It will be appreciated that other forms of engagement between a driving shaft and the driving member 12 could easily be used in lieu of the toothed arrangement shown in FIG. 2.

The driving member 12 includes an inner face 22 having a pair of concentrically disposed, raised thrust shoulders 24a and 24b thereon. Between the thrust shoulders 24a and 24b are a plurality of key engaging notches 26a, 26b, and 26c. It will be appreciated that a greater or lesser number of key engaging notches could just as well be used if so desired. The greater the number of key engaging notches 26 used the more quickly the apparatus 10 will become engaged when the driving member 12 is rotated in a first rotational direction, while the lesser the number of key engaging notches 26 used the less quickly the apparatus 10 will become engaged.

With reference to FIG. 6, the key engaging notches 26b is shown in a side cross-sectional view. Key engaging notch 26b includes, as do notches 26$b_2$ and 26c, an angled wall portion 2$b_1$, a bottom-most portion 26$b_2$, and a wall portion 26$b_3$. The degree of incline of the angled wall portion 26$b_1$ may vary somewhat but is preferably within the range of about 15° to 45° from the interface 22 of the driving member 12, and more preferably about 15°–30° relative to the surface of the inner face 22.

With further reference to FIGS. 1 and 6, it will be appreciated that the driven member 16 also preferably includes a plurality of key engaging notches 28, and a pair of raised thrust shoulders 17a and 17b. While a plurality of notches 28 is preferred, it should also be realized that the apparatus 10 could easily operate with just a single key engaging notch 28 if so desired. By using a plurality of key engaging notches 28, the degree of rotational travel of the driving member 12 and the carrier plate 14 before the apparatus 10 becomes engaged is reduced. In the preferred embodiment of the apparatus 10, the driven member 16 includes three key engaging notches 28a, 28b and 28c (each being illustrated in phantom in FIG. 3 to illustrate an exemplary orientation relative to the notches 26 and keys 36). Again, however, a greater or lesser number of notches 28 could be formed in the driven member 16 depending upon the needs of a particular application and the amount of "play" desirable in the apparatus 10 before same becomes engaged. With brief reference again to FIG. 6, the key engaging notch 28b of the driven member 16 forms a notch which is preferably identical to each of notches 26. Accordingly, key engaging notch 28a likewise includes an angled wall portion 28$a_1$, a bottom portion 28$a_2$ and a wall portion 28$a_3$.

With further reference to FIG. 1, it will also be noted that each of the notches 26 and 28 are formed at equal distances from the axis of rotation of each of their members 12 and 16, respectively. Accordingly, as the driving member 12 and carrier plate 14 rotate during operation of the apparatus 10, the notches 26 will, at some point during rotation of the driving member 12, be aligned over the notches 28, thus allowing the apparatus 10 to become engaged and disengaged, as will be explained more fully momentarily.

With reference to FIG. 3, the carrier plate 14 is shown. The carrier plate includes an aperture 30 formed in a central portion 32 thereof, and a plurality of circumferentially spaced cut-out portions 34a, 34b, 34c, 34d and 34e within which are disposed a corresponding plurality of engaging elements in the form of keys 36a, 36b, 36c, 36d, 36e. Again, it will be appreciated that a greater or lesser number of keys could be incorporated into the carrier plate 14 with a greater number causing quicker engagement-of the apparatus 10 and a lesser number causing less quick engagement of the apparatus 10. In FIG. 3, it will also be noted that the key engaging notches 26a, 26b and 26c are positioned relative to the keys 36 such that no portion of any two keys can possibly engage any two of notches 26a, 26b, 26c at any given time. This will also be explained more fully in connection with the explanation of operation of the apparatus 10. The cut-outs 34 are further spaced circumferentially about the axis of rotation of the carrier plate 14, which is represented by the very center of the drive shaft 18, so as to be positioned between the key engaging notches 26 in the driving member 12 and the key engaging notches 28 in the driven member 16 when assembled between the members 12 and 16.

With brief reference to FIG. 4, one of the keys 36c is shown, together with a biasing means in the form of a coil spring 38 for biasing the key 36c into engagement with the key engaging notches 26 and 28. Key 36c is identical to each of the other keys 36a, 36b, 36d and 36e illustrated in FIG. 3 and generally includes a main body portion 40 having a first end portion 42, a second end portion 44, and arm portions 46 protruding outwardly of the main body portion 40 and integrally formed with the main body portion 40. The coil spring 38 includes end portions 38a and a central portion 38b which fits over a portion of the main body portion 40 to provide a constant biasing force on the main body portion 40 which tends to constantly urge the main body portion 40 rotatably about the arm portions 46. The first and second end portions 42 and 44 each include a chamfered portion 42a and 44a, respectively, which helps facilitate smooth engagement of the first and second end portions 42 and 44 into the key engaging notches 28 and 26.

With reference to FIG. 5, the key 36c can be seen in assembly relation with the driving member 12, the carrier plate 14 and the driven member 16. The arm portions 46 of the key 36c are adapted to rest in grooves 48 formed in the carrier plate 14 on opposing sides of the cut-out 34c. Accordingly, the key 36c is able to rotate pivotally about its arms 46 between a first position, wherein the main body portion 40 of the key 36c is almost parallel to the central portion 32 of the carrier member 14, to a second position wherein the first and second end portions 42 and 44, respectively, are protruding outwardly from opposing sides 14a and 14b of the carrier plate 14. The end portions 38a of the coil spring 38 are adapted to rest on the surface 14a of the carrier plate 14 adjacent the cut-out portion 34c, as shown in FIGS. 6 through 9. Thus, the end portions 38a and the central portion 38b provide a biasing force which tends to constantly urge the first and second end portions 42 and 44, respectively, of the key 36c rotationally such that each protrude outwardly of the surfaces 14a and 14b of the carrier plate 14. It should be appreciated, moreover, that the key 36c is merely one embodiment of many forms of keys that could be implemented with the apparatus 10 without departing from the scope of the appended claims. Those of ordinary skill in the art will appreciate that a wide variety of keys could be formed which are easily adaptable to be supported within the carrier plate.

Turning now to FIGS. 6–9, a description of the operation of the one-way clutch apparatus 10 of the present invention will be provided. FIG. 6 illustrates the apparatus 10 in its disengaged position wherein the key 36b, by example, is not engaged with either of the key engaging notches 26b or 28c. Thus, as the driving member 12 is moved rotationally in accordance with directional arrow 50 (also shown in FIG. 2) the second end portion 44 of the key 36a rides along the inner face 22 of the driving member 12 and is biased into constant engagement with the inner face 22 of the driving member 12 by the spring 38. At this point the driving member 12 is moving rotationally but little or no movement is occurring with the carrier plate 14 or the driven member 16 relative to the driving member 12. It will be noted that raised thrust surfaces 24a and 24b of the driving member (only shoulder 24b being shown in FIGS. 6–9), and the raised thrust shoulders 17a and 17b (only shoulder 17b being shown in FIGS. 6–9) maintain the carrier plate 14 at predetermined distances from the inner face 22 of the driving member 12 and the inner face 21 of the driven member 16.

Figure 7:
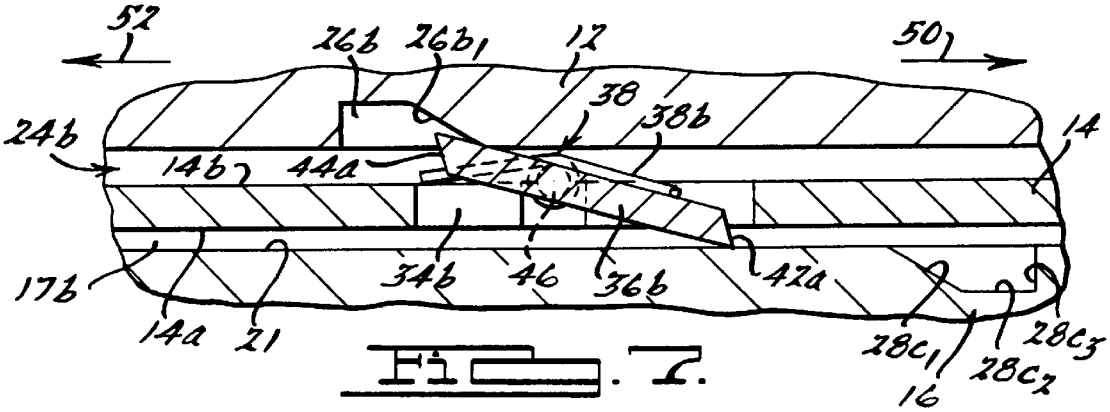
FIG. 7 shows the apparatus of FIG. 6 as the driving member is moved rotationally in a first rotational direction such that the key of the carrier plate begins to engage the key engaging portion of the driving member.

Referring now to FIG. 7, as the driving member 12 is urged rotationally over the key 36b, the biasing force of the spring 38 causes the second end portion 44 of the key 36b to be urged into the key engaging notch 26b. The clearance between the carrier plate 14 and the driven member 16 allows the first end portion 42 of the key 36b to be urged just slightly outwardly of the carrier plate 14, thus allowing the second end portion 44 to protrude slightly into the key engaging notch 26b. The small amount of clearance between the surface 14b of the carrier plate 14 and the inner face 21 of the driven member 16 provided by the raised thrust shoulder 17b permit this small degree of rotational movement of the key 36b. At this point the carrier plate 14 and driven member 16 remain substantially or completely stationary while the driving member 12 continues to rotate in accordance with directional arrow 50.

Figure 8:
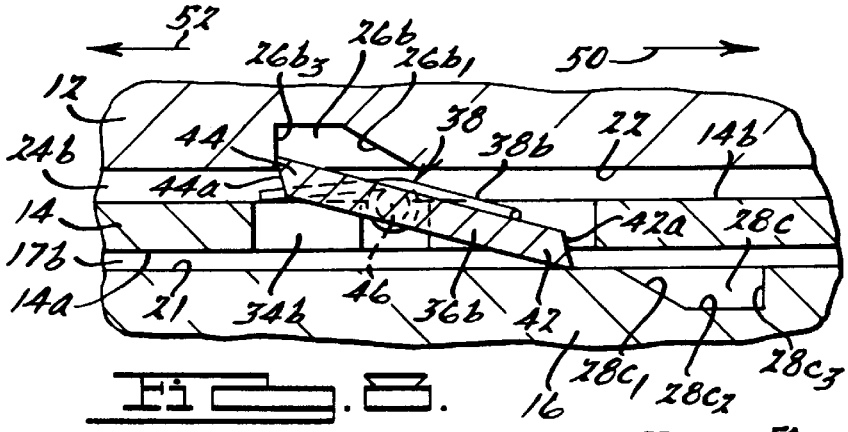
FIG. 8 is a view of the apparatus of FIG. 7 showing the key abuttingly engaging the wall portion of the driving member as the driving member continues to rotate in the first rotational direction.

Referring to FIG. 8, when the chamfered end 44a of the key 36b comes into contact with the wall portion 26$b_3$ of the key engaging notch 26b, the driving member 12 begins to urge the carrier plate 14 in the direction of directional arrow 50 as it continues to move in the first rotational direction, indicated by arrow 50. At this point the driving member 12 and the carrier plate 14 are being moved in the direction of directional arrow 50 while the driven member 16 continues to remain stationary or substantially stationary. The first end portion 42 of the key 36b continues to ride along the inner face 21 of the driven member 16.

Figure 9:
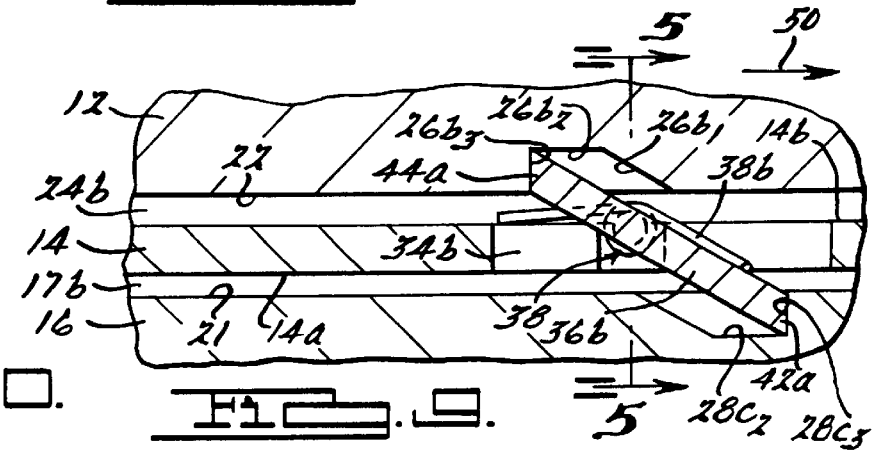
FIG. 9 is a view of the apparatus of FIG. 8 showing the key of the carrier plate fully engaged with the wall portion of the driving member and with the wall portion of the driven member, thereby allowing the driving member to transmit a driving force through the key to drive the driving member.

Referring now to FIG. 9, as the drawing member 12 urges the carrier plate 14 and key 36b over the key engaging notch 28c, the first end portion 42 of the key 36b is allowed to drop into engagement with the wall portion 28$c_3$ of the notch 28c in response to the biasing force of the spring 38. Smooth engagement is facilitated by the angled wall portion 28$c_1$. At this point the apparatus 10 is fully "engaged". Thereafter, continued movement in the direction of directional arrow 50 (i.e., the first rotational direction) allows the driving member 12 to impart a driving force through the key 36b to the driven member 16, thus driving the driven member 16 also in the direction of directional arrow 50. The driving member 12, the carrier plate 14 and the driven member 16 all rotate simultaneously in the direction of directional arrow 50. The degree of pivotal rotation of the key 36a may vary somewhat but is preferably within the range of about 2°–10°, and more preferably about 3° relative to the surfaces 14a and 14b of the carrier plate 14. Also, the degree of rotation of the driving member 12 before becoming fully engaged with the driven member 16 may vary, but in most instances it is expected to be relatively small. It is anticipated that, for most applications, this degree of rotation will be most preferably about 2°–10°, and most preferably about 6° before full engagement of the apparatus 10 occurs.

When disengagement of the one-way clutch apparatus 10 is desired, the description of operation with regard to FIGS. 6–9 is essentially reversed. Assuming the apparatus 10 is fully engaged as illustrated in FIG. 9, reversing the direction of rotation of the driving member 12 to a second rotational direction indicated by directional arrow 52 causes the second end portion 44 of the key 36b to engage the angled wall portion 26$b_1$, as generally indicated in FIG. 7. As the driving member 12 continues to rotate in the direction of directional arrow 52, the second end portion 44 of the key 36b is urged downwardly in the drawing of FIG. 7 towards the carrier plate 14 by the angled wall portion 26$b_1$ and then by the inner face 22 of the driving member 12. Continued rotation in the direction of directional arrow 52 by the driving member 12 will not cause engagement with any one of the keys 36a–36e. Thus, the driving member 12 "over-runs", or is free to rotate in the direction of directional arrows 52. As the driving member 12 continues to rotate in the direction of arrow 52, lubricant (i.e., oil) between the inner face 22 of the driving member 12 and the surface 14b of the carrier plate 14 causes the carrier plate 14 to begin rotating in the over-running direction of arrow 52 such that the first end 42 of the key 36b is urged smoothly out of engagement with the notch 28c. Angled wall portion 28c, helps facilitate this smooth disengagement. Thereafter the first end 42 of the key 36b will be dragged over the inner face surface 21 of the driven member 16. At actual operating speeds the rotational speed of the carrier plate 14 will be such that the first end 42 of each key 36 will not have sufficient time to "drop" into the notches 28, thus producing a smooth, generally over-running action of the carrier plate 14. As the rotational speed of the driving member increases in this direction, rotational resistance from the lubricant present between members 12 and 16 causes the carrier plate 14 to eventually attain a rotational speed which is dictated by the requirement that the frictional "drag" on each side of the carrier plate 14 be equal and opposite. When this point is reached, the speed of the carrier plate 14 will be approximately ½ the difference in speed between the driving member 12 and the driven member 14. Should the driving member 12 again be rotated in the direction of directional arrow 50, then the sequence of operation described in connection with the engagement of the apparatus 10, as illustrated in FIGS. 6–9, will again take place.

As mentioned previously, it is important that the spacing of the notches 26 and 28 as well as the keys 36 is such that no two keys 36 can become engaged simultaneously. It is expected that such an occurrence would cause possibly a destructive action as the force transmitted by the driving member 12 would be transmitted throughout the entire carrier plate 14 rather than principally through one of the keys 36. It will also be appreciated that the apparatus 10 could be designed such that two or more keys are engaged simultaneously to permit the driving force to be shared equally therebetween. If such is the case, then it will be appreciated that either the manufacturing tolerances of the notches 26 and 28 will have to be held within very strict limits or the keys 36 will have to be manufactured from some material that allows a slight degree of compression or deformability to compensate for manufacturing variations in the precise positioning of the notches 26 and 28. This would allow each key 36 to make engagement with a respective pair of notches 26 and 28 and to transmit at least a portion of the driving force.

Figure 10:
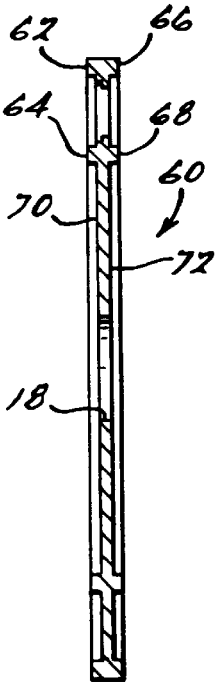
FIG. 10 is a cross sectional side view of an alternative preferred embodiment of the carrier plate including raised thrust shoulders thereon.

Referring now to FIG. 10, an alternative preferred embodiment of the carrier plate 60 of the present invention is shown. The carrier plate 60 is identical to the carrier plate 14 with the exception of raised thrust shoulders 62, 64, 66 and 68 formed on opposing side surfaces 70 and 72 thereof. Since the carrier plate 60 includes thrust shoulders 62–68, neither the driving member 12 nor the driven member 16 need include these shoulders. Accordingly, the thrust shoulders 62–68 will maintain the surfaces 70 and 72 at the proper predetermined distances from the driving member 12 and the driven member 16. It is expected that in some, if not most, applications that the carrier plate 60 will be the preferred form for the carrier plate because it allows the driving member 12 and the driven member 16 to be manufactured more simply.

The various components of the one-way clutch apparatus 10 are preferably manufactured from suitably strong materials for the application with which the apparatus 10 is to be used and the forces to be transmitted through the keys 36. The carrier plate 14 may be manufactured as a stamping or powder metal, or from any suitable friction bearing material. The keys 36 may also be manufactured as stampings, or by extrusion, forming or compaction processes, or plastic molding. Preferably, the thicknesses of the keys 36 is less than that of the carrier plate 14.

The one-way clutch apparatus 10 of the present invention provides significant advantages over prior one-way (overrunning) clutch designs. First, since the keys are mounted for rotational movement within the carrier plate 14, they do not tend to "float" as with prior designs. Thus, the keys 36 are more stable and less likely to become accidentally disengaged as the one-way clutch assembly assumes various orientations relative to the earth's surface, such as might be encountered in land-based vehicle and aircraft applications.

Another significant advantage provided by the apparatus 10 is the reduced criticality of a constant supply of lubricant to the keys 36. With prior designs of one-way clutches, brief, momentary lapses of lubrication such as those that might be encountered as the one-way clutch assumes different attitudes relative to the earth's surface could cause undesirable operational characteristics or significantly accelerated wear and tear. With the apparatus 10, the criticality of a constant source of lubrication to provide proper operation of the keys 36 is reduced. Thus, the keys 36 are considerably less likely to be affected by a brief lapse in lubrication around any engaged key 36.

Referring to FIG. 11, there is shown an apparatus 100 in accordance with an alternative preferred embodiment of the present invention. The apparatus generally comprises a carrier member in the form of an annular carrier ring 102 having at least one cut-out 104 formed therein. Within the cut-out 104 is a key 106 mounted for pivotal movement within the carrier ring 102. The key 106 includes a pair of arm portions 106a extending outwardly thereform which fit within notches formed in a surface 102a of the carrier ring 102. In the preferred embodiment shown in FIG. 11, it will be noted that the arm portions 106a are formed at the longitudinal center of the key 106. The notches which support the key 106 may be identical to those shown in FIG. 5. Similarly, when the arm portions 106 are formed at the longitudinal center of the key a spring (not shown) such as spring 38 is disposed about at least one of the arm portions 106a to bias the key 106 such that its ends protrude outwardly of the outer surface 102a and an inner surface 102b of the carrier ring 102. The carrier ring 102 is further disposed concentrically between an inner ring 108 and an outer race 110, with the inner and outer races 108 and 110, respectively, each being disposed concentrically to one another.

The inner race 108 includes at least one notch 112 formed in an outer surface 114 thereof. Similarly, the outer race 110 has at least one notch 116 formed on an inner surface 118 thereof. The carrier ring 102, inner race 108 and outer race 110 are further disposed so as to be vertically (i.e., laterally) aligned with one another. Any conventional means such as one or more snap rings may be employed to help maintain the outer race 110, inner race 108 and carrier ring 102 laterally aligned with each other. The snap ring(s) may be secured to an external shaft concentrically disposed to all three components 110, 108 and 102 or be may releasably secured to a portion of a housing within which the components 110, 108 and 102 are disposed. It will be appreciated, however, the virtually any device may be used to keep the components 110, 108 and 102 in lateral alignment provided same at least allows a rotational movement of the inner race 108 relative to the carrier ring 102, or movement of the outer race 110 relative to the carrier ring 102. Optionally, the inner race 108 may include a plurality of teeth 120 on an inner surface 122 thereof, while the outer race 110 may optionally include a plurality of teeth 124 on an outer surface 126 thereof.

With reference to FIG. 12, an alternative preferred form 107 of the key 106 shown in FIG. 11 is illustrated. The key 107 includes a main body portion 128 and a pair of arm portions 130 projecting outwardly from the main body portion 128. The main body portion 128 is shown as being slightly curved, but it will be appreciated that body portion 128 could function very satisfactorily without such a curvature but rather as a flat member such as that shown in FIG. 11. Both forms are contemplated to be within the scope of the appended claims. With a curved shape, however, the key 107 has more of an ability to deform or compress slightly, especially if formed from a plastic, to thus "cushion" somewhat the engagement with the notches 112 and 116.

In the drawing of FIG. 12 the arm portions 130 are also shown being formed offset from the longitudinal center of the main body portion 128. When offset as shown, the centrifugal force experienced by the carrier ring 102 during operation when the carrier ring 102 is rotated in the locking direction will help bias the ends of the key 107 outwardly to cause the key 107 to lockably engage with the notches 112 and 116 in the inner and outer races 108 and 110, respectively. Should the arm portions 130 be formed at the longitudinal center of the main body portions 128, centrifugal force will not significantly influence (i.e., bias) the main body portion 128 at one or the other of its outermost ends outwardly of the carrier ring 102. In this situation then some form of biasing means such as the coil spring 38 (FIG. 5) is required to maintain the outermost ends 128a and 128b of the main body portion 128 biased outwardly of the carrier ring 102. It will be appreciated that with either key 106 or 107, the arm portions may be substituted for a pin, provided an aperture is formed in the key 106 or 107 where the arm portions 106a or 130 extend. If a pin is included, then apertures will need to be formed through the carrier ring 102 in alignment with the aperture in the key 106 or 107 to allow the key 106 or 107 to be pivotally suspended within the cut-out 104.

Referring to FIG. 13, the carrier ring 102 can be seen vertically aligned with the inner race 108 and the outer race 110. In this embodiment the carrier ring includes an outer surface 132 and an inner surface 134 which act as bearing surfaces relative to the outer race 110 and the inner race 108, respectively. This helps to maintain the concentricity of the inner race 108, the carrier ring 102 and the outer race 110.

Referring now to FIG. 14, an alternative preferred form of construction 136 of the apparatus is shown. In this embodiment the carrier ring 102 of FIG. 11 is disposed concentrically between an inner race 138 and an outer race 140. The inner race 138 includes an annular shoulder portion 138a while the outer race 140 includes a similar annular shoulder portion 140a. The carrier ring 102 is disposed concentrically between the inner and outer races 138 and 140, respectively, and is further maintained laterally aligned between side portions 138b of the inner race 138 and side portions 140b of the outer race 140 by the shoulder portions 138a and 140a. In this embodiment the inner race 138 and outer race 140 each act as a bearing surface to help maintain the carrier ring 102 concentrically and laterally aligned therebetween.

With either of the embodiments 100 or 136, the key used therewith may be generally flat or curved. If curved, the degree of curvature may be adjusted to the application such that the curvature can facilitate slight elastic bending to reduce impact loads as the key 106 engages. The curvature can also allow for some elastic behavior to compensate for manufacturing tolerances should multiple keys be used about the carrier ring 102, to thus further ensure that all of the keys engage substantially simultaneously. Manufacturing the key 106 or 107 from high strength plastic may also add to the elasticity of the key if this characteristic is desired.

Referring again to FIG. 11, the operation of the apparatus 100 will be described. Initially, in some applications it may be desirable to lock the carrier ring 102 to either the inner race 108 or the outer race 110. For the purposes of illustration only, it will be assumed that the carrier ring 102 is not locked to either the inner race 108 or the outer race 110 but is free to move independently therebetween. It should be appreciated however, that each embodiment of the apparatus 100 may be configured to rotate independent of both the inner and outer races 108 and 110 in a free-wheeling direction, or fixed to rotate with one or the other of the races 108 and 110, depending on the requirements of a particular application.

When the outer race 110 is moving clockwise relative to the carrier ring 102, there is no engagement of the key 106 with any of the notches 116. In this instance the outer race 110 is said to be rotating in the "over-running" direction and such rotational movement does not cause any engagement of the carrier ring 102 therewith nor any engagement with the inner race 108. Thus, the outer race 110 rotates without driving either the carrier ring 102 or the inner race 108.

When the outer race 110 is rotated in the opposite direction (i.e., counterclockwise), an outer end portion 106b of the key 106 is biased into one of the notches 116 thus engaging therein. As the outer race 110 continues to rotate counterclockwise in the drawing of FIG. 11, it moves the carrier ring with it a very short distance before the opposite outer end portion 106c of the key 106 engages in one of the notches 112 in the inner race 108. After this point, continued rotation of the outer race 110 in the conterclockwise direction drives the carrier ring 102 and the inner race 108 simultaneously in the counterclockwise direction therewith. If the outer race 110 is thereafter rotated in the clockwise direction, the key 106 will ride out of the notches 116 and 112 due to the slope of the wall portions 112a and 116a of the notches 11. The operation of embodiment 136 shown in FIG. 14 is identical to that of the embodiment 100 shown in FIG. 11.

If the key 106 is constructed such that its arm portions 130 are offset from the longitudinal center, as described in connection with FIG. 12, then the carrier ring 102 may be used as the driving member to cause driving engagement with either, or both, of the inner race 108 and the outer race 110. Engagement is effected by the centrifugal force experienced by the key 106 when the carrier ring 102 is rotated in the direction which causes outermost end portion 128a (FIG. 12) to be urged outwardly of the carrier ring 102. In this fashion one or more concentrically disposed races can be driven by the-carrier ring 102.

With either form of key 106 or 107 engagement with one or both of the inner race 108 and outer race 110 is maintained by either the centrifugal force experienced by the key, which tends to keep it biased outwardly of the carrier ring 102, or the biasing force provided by a spring associated with the key 106 or 107. Thus, once engaged, the key remains engaged unless the direction of either the inner race 108 or the outer race 110, or both, is changed to the over-running direction.

Figure 15:
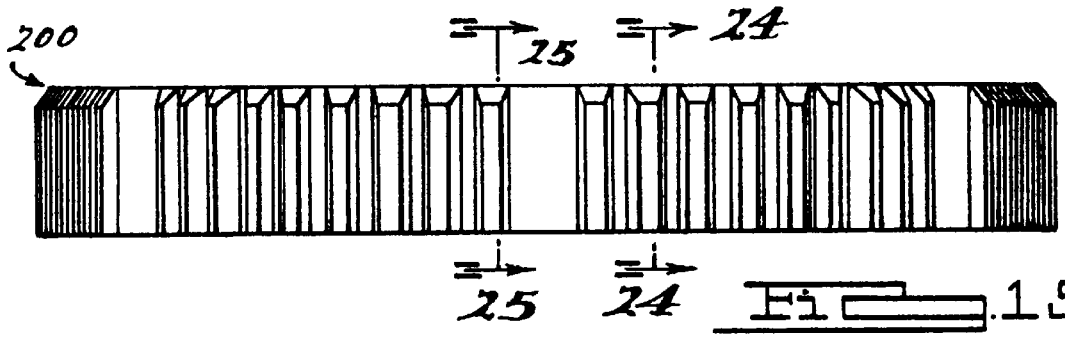
FIG. 15 is a side view of a clutch apparatus in accordance with an alternative preferred embodiment of the present invention.
Figure 16:
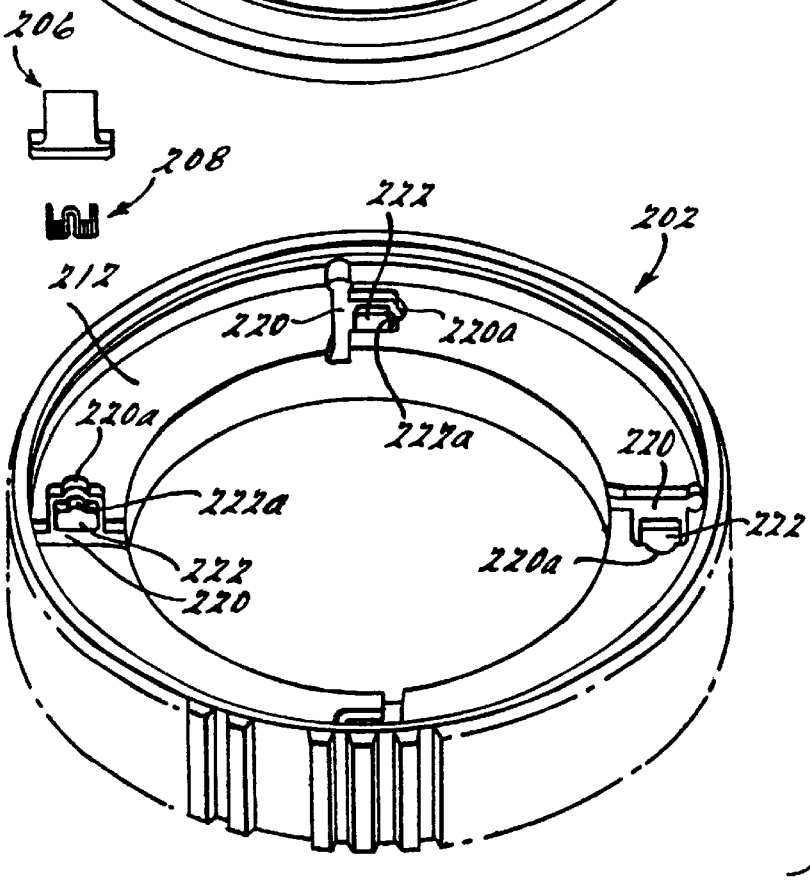
FIG. 16 is an exploded perspective view of the clutch apparatus of FIG. 15.
Figure 17:
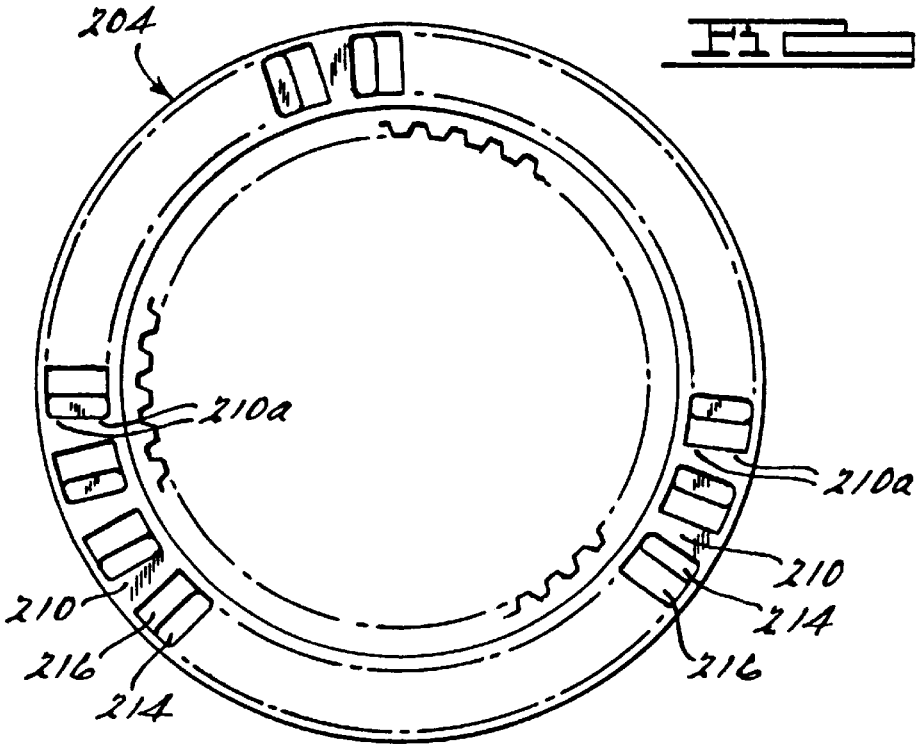
FIG. 17 is a plan view of the driven member of the clutch apparatus of FIG. 16.
Figure 18:
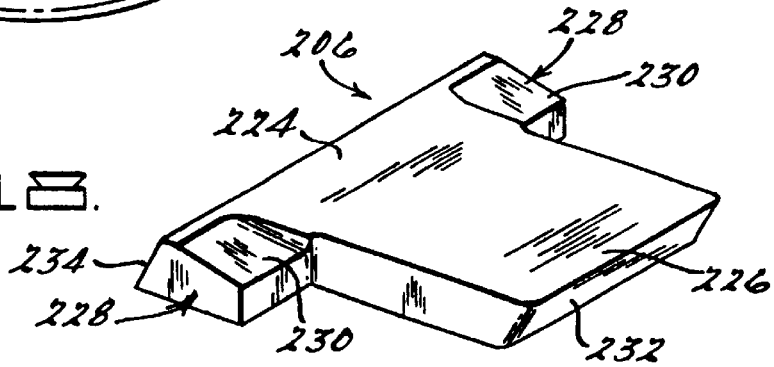
FIG. 18 is an enlarged perspective view of the key of the one-way clutch apparatus shown in FIG. 16.
Figure 19:
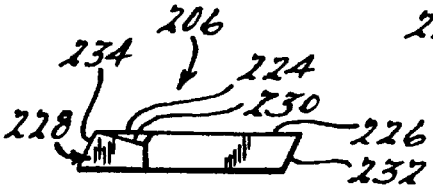
FIG. 19 is a side view of the key shown in FIG. 18.
Figure 21:
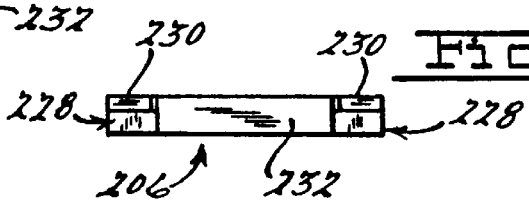
FIG. 21 is a front view of the key of FIG. 18.
Figure 20:
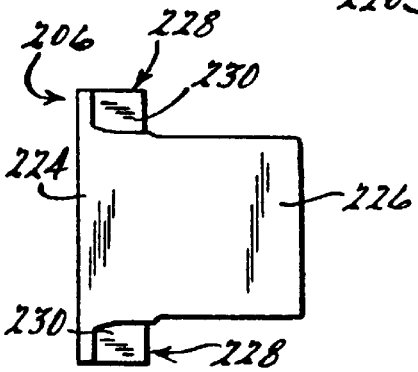
FIG. 20 is a top view of the key shown in FIG. 18.
Figure 23:
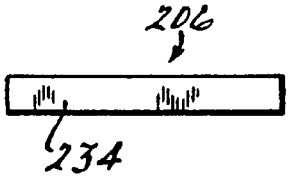
FIG. 23 is a rear view of the key shown in FIG. 18.
Figure 22:
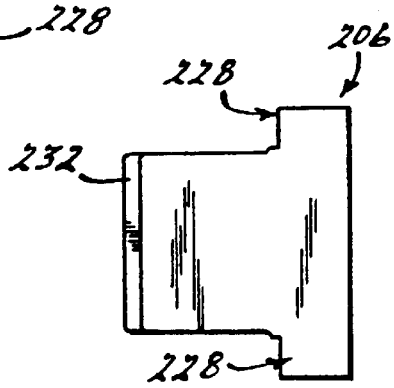
FIG. 22 is a bottom view of the key shown in FIG. 18.

Referring now to FIGS. 15, 16 and 17, a one-way clutch apparatus 200 in accordance with an alternative preferred embodiment of the present invention is shown. With specific reference to FIG. 16, the apparatus 200 comprises a driving member 202, a driven member 204, at least one key or strut 206 and at least one biasing member in the form of a spring 208 associated with each key 206. With specific reference to FIG. 17, the driven member 204 includes a planar inside surface 210. The planar inside surface 210 is positioned generally parallel and closely adjacent to a planar inside surface 212 (FIG. 16) of the driving member 202.

With further reference to FIG. 17, the driven member 204 includes a plurality of circumferentially arranged key-engaging notches 214 with each having a sloped portion 216 formed in the planar inside surface 210 thereof.

With further reference to FIG. 16, the planar inside surface 210 of the driving member 202 includes a plurality of recesses 220 formed therein for housing an associated key 206. Each recess 220 further includes a secondary recess 222 adapted to support substantially therein a spring identical to spring 208. Each of the recesses 220 are further shaped generally in accordance with the shape of the 206 such that the key 206 can rest completely within its associated recess 220. To facilitate better flow of lubricant into and out of the recesses 220 and 222, each recess 220 preferably includes a semi-circular relief portion 220a. Similarly, each secondary recess 222 preferably includes a similarly shaped relief portion 222a.

With specific reference to FIGS. 18–23, the key 206 is shown. The key includes a back end portion 224, a front end portion 226 and a pair of laterally projecting arms 228. Each of the arms 228 includes a ramp portion 230 which, in effect, forms a "relief" for allowing the planar inside surface 210 of the driven member 204 to be spaced close to the inside planar surface 212 of the driving member 202 without interference from the arm portions 228 when the front end portion 226 of the key 206 is engaged within one of the key-engaging notches 214. This feature of the clutch apparatus 200 will be described in greater detail momentarily.

With further reference to FIGS. 18–23, the key 206 further includes a slightly sloped front edge portion 232 and a slightly sloped rear edge portion 234. The sloped front edge portion 232 allows a positive, abutting engagement between the front end portion 226 of the key 206 with one of the key-engaging notches 214 when the key 206 is urged into engagement with one of the notches 214 by its associated spring 208. The sloped rear edge portion 234 allows an added degree of clearance between the back end portion 224 of the key 206 and the recess 220 within which the key 206 rests when the front end portion 226 of the key 206 is urged into engagement with one of the key-engaging notches 214.

Figure 24:
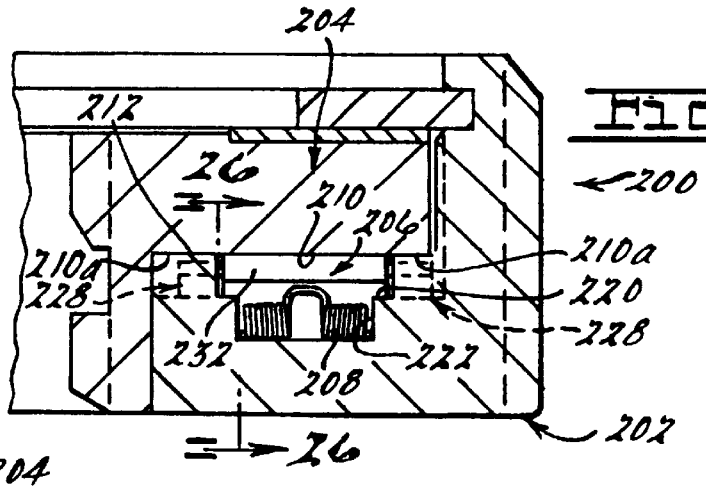
FIG. 24 is a cross-sectional view in accordance with section line 24—24 in FIG. 15 showing the close proximate positioning of the driven member to the driving member and the key disengaged with the driven member.
Figure 26:
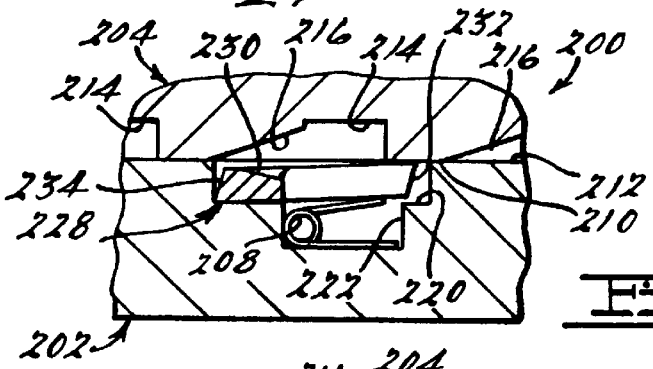
FIG. 26 is a cross-sectional side view of the clutch apparatus taken in accordance with section line 26—26 in FIG. 24.

With reference to FIGS. 24 and 26, the front end portion 226 of the key 206 is shown being urged into abutting contact with the planar inside surface 210 of the driven member 204 by one of the springs 208. When the driving member 202 is rotated in a first, non-driving direction (to the left in the drawing of FIG. 26), the key 206 rides over the key-engaging notches 214 to allow the driving member 202 to free-wheel. As the driving member 202 free-wheels, the keys 208 alternatively are urged into the key-engaging notches 214 and then urged out as they ride over the sloped portions 216.

Figure 25:
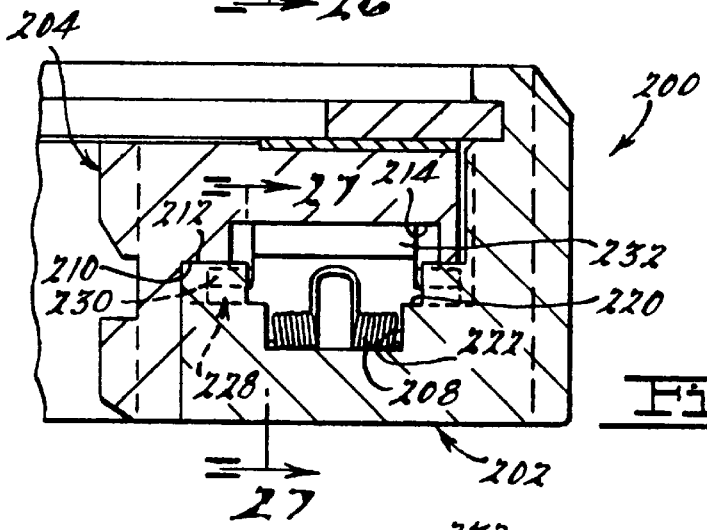
FIG. 25 is a cross-sectional side view in accordance with section line 25—25 in FIG. 15 showing the driven member after same has rotated a sufficient number of degrees to enable the front end of the key to engage within a key-engaging notch of the driven member.
Figure 27:
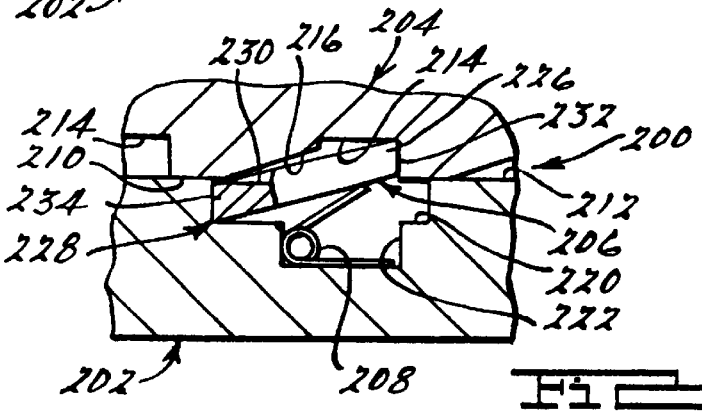
FIG. 27 is a cross-sectional side view of the clutch apparatus taken in accordance with section line 27—27 in FIG. 25.

With reference now to FIGS. 25 and 27, when the driving member 202 is rotated in a direction opposite to its free-wheeling direction (to the right in the drawing of FIG. 27), at least one key 206 is urged by its associated spring 208 such that the front end portion 226 of the key 206 abuttingly engages the key-engaging notch 214 of the driven member 204. It is a principal advantage of the present invention that the ramp portions 230 formed on each of the arms 228 of the key 206 allow the front end portion 226 of the key 206 to be urged outwardly into the key-engaging notch 214 without the arm portions 228 interfering with surface portions 210a (FIG. 17) of the planar inside surface 210 of the driven member 204. It is a further important advantage of the clutch apparatus 200 that the ramp portions 230 of the arms 228 of the key 206 allow the surface portions 210a of the driven member 204 to be extended inwardly relative to the key 206 to therefore "overlay" portions of each of the arm portions 228 of the key 206. In this manner, surface portions 210a of the driven member 204 can be used to help maintain the back end portion 224 of the key 206 within the recess 220. This provides a significant advantage in that the recess 220 does not need to be substantially filled with the lubricant to "damp" unwanted movement of the back end portion 224 of the key 206. Instead, the surface portions 210a, together with a nominal degree of lubricant, operate to maintain (i.e., damp) movement of the back end portion 224 of the key 206. Accordingly, the critical need for a continuous and copious degree of fluid within the recess 220 to satisfactorily damp unwanted movement of the key 206 is eliminated. This allows the clutch apparatus 200 to be used in even higher rpm applications, such as those where the apparatus 200 is exposed to conditions of rotation of 5000 rpm or higher.

With further reference to FIG. 27, the clearance provided by the ramp portions 230 of the arm portions 228 can be seen. Without the ramp portions 230, the key 206 would not be able to attain the degree of rotation shown in FIG. 27 because of the surface portions 210a overlaying the arm portions 228. The sloped front edge portion 232 and sloped rear edge portion 234 can further be seen to provide positive engagement with the key-engaging notch 214 of the driven member 204 and the recess 220 of the driving member 202, respectively.

Figure 28:
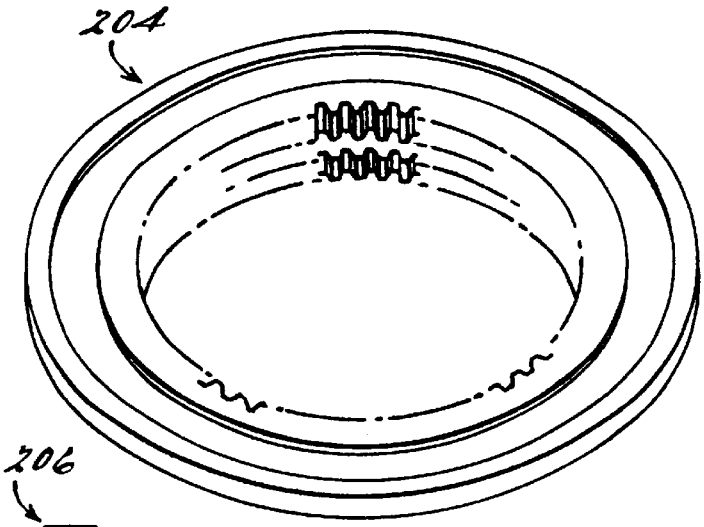
FIG. 28 is a perspective fragmentary view of a portion of an alternative preferred embodiment of the driven member in which a retaining member is used to limit movement of the back end portion of the key.
Figure 28:
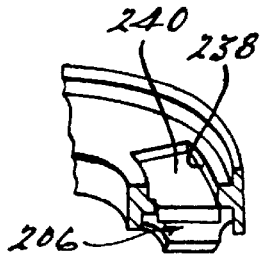

Referring briefly to FIG. 28, an alternative means is shown for limiting movement of the back end portion 224 of the key 206. This means involves a recess 238 which is formed in the planar inside surface 212 of the driving member 202. This recess 238 is positioned closely adjacent each recess 220 such that each recess 238 opens into an associated one of the recesses 220. In each recess 238 is placed a retaining member 240 which may be spot-welded or similarly secured within the recess 238 after the key 206 has been inserted in the recess 220. The retaining member 240 has a length which is sufficient to overlay only the back end portion 224 of the key 206 to thereby prevent the back end portion 224 from lifting during operation of the clutch 200.

While the above description constitutes the preferred embodiment of the invention, it will be appreciated that the invention is susceptible to modification, clarification, and change without departing from the proper scope or fair meaning of the accompanying claims.

What is claimed:

1. A one-way clutch apparatus comprising:

a planar driving member;

said planar driving member including at least one recess formed on an inside surface thereof;

at least one biasing member disposed on said recess;

a free floating key disposed in said recess over said biasing member so as not to be physically secured to said planar driving member, said key having at least one arm portion having a ramp portion thereon, said key being operable to pivot about said arm portion between an engaged position and a disengaged position;

a planar driven member disposed closely adjacent said driving member, said planar driven member having at least one key-engaging notch formed on an inside surface thereof at a position in radial alignment with said key;

said planar driving and said driven members being rotatable about a common longitudinal axis such that when said planar driving member is rotated in a first direction, said key is moved over said key-engaging notch without engaging within said key-engaging notch, and when said planar driving member is rotated in a second rotational direction opposite to said first direction, said biasing member is allowed to urge said key into engagement with said key-engaging notch, thereby causing said driven member to be driven rotationally in accordance with rotation of said driving member; and said ramp portion of said arm portion of said key further enabling said key to be pivoted into engagement with said key-engaging notch without said arm portion key interfering with said inside surface of said planar driven member when said planar driven member is in assembled and in close proximity with said planar driving member.

2. The apparatus of claim 1, wherein said key-engaging notch has a smaller cross-sectional area than said recess such that a portion of said planar inside surface of said driven member overlays at least a portion of said arm portion of said key when said key is in said engaged position within said key-engaging notch; and wherein said ramp portion formed on said arm portion of said key eliminates interference between said arm portion and said inside surface when said key is urged by said biasing member into said engaged position within said key-engaging notch.

3. The apparatus of claim 1, wherein said key includes a sloped front edge portion.

4. The apparatus of claim 1, wherein said key includes a sloped rear edge portion.

5. The apparatus of claim 1, wherein said key includes a pair of arm portions extending in opposite directions at a back end portion of said key, said key being adapted to pivot about said pair of arm portions between said engaged and said disengaged positions.

6. The apparatus of claim 5, wherein said planar driving member includes a plurality of recesses spaced circumferentially about said inside surface thereof;

wherein each one of said plurality of recesses includes a secondary recess adapted to at least partially support an associated biasing member therein; and wherein each said recess further includes an associated key adapted to be urged between said engaged and disengaged positions by said biasing member.

7. The apparatus of claim 6, wherein said planar driven member includes a plurality of circumferentially arranged key-engaging notches, with each one of said key-engaging notches adapted to receive a portion of at least one of said plurality of keys when said planar driving member is rotated in said planar second rotational direction.

8. The apparatus of claim 7, wherein said planar driven member includes a plurality of sloped portions with each said sloped portion being disposed adjacent each said key-engaging notch, said sloped portions being adapted to allow at least one of said plurality of keys to be urged gradually into engagement with said key-engaging notch when said planar driving member is rotated in said second rotational direction.

*9. A one-way clutch apparatus comprising:*

*a first planar member rotatable about an axis having an inside surface extending generally normal to the axis, the first member having at least one recess formed in the inside surface thereof;*

*a second planar member rotatable about the axis having an inside surface extending generally normal to the axis and disposed closely adjacent to the inside surface of the first member, the second member having at least one notch formed on the inside surface thereof, the second member having an annular flat portion formed on the inside surface thereof;*

*a free-floating key disposed in the recess so as not to be physically secured to the first member, the key including a back end portion, a front end portion, and at least one laterally projecting arm portion, the key being movable between a notch-engaging engaged position and a disengaged position; and*

*a biasing member carried by the first planar member urging the key to the engaged position;*

*wherein the flat portion of the inside surface of the second member overlays at least a portion of the arm portion of the key to maintain the back end portion of the key in the recess when the key is in the disengaged position.*

*10. The apparatus of claim 9, wherein the arm portion includes a ramp portion engageable with the flat portion of the inside surface of the second member.*

*11. The apparatus of claim 10, further including a biasing member, carried by the first member, urging the key to the engaged position.*

*12. The apparatus of claim 11, wherein the ramp portion of the arm portion of the key eliminates interference between the arm portion and the inside surface of the second member when the key is urged by the biasing member into the engaged position.*

*13. A one-way clutch apparatus comprising:*

*a first planar member rotatable about an axis having an inside surface extending generally normal to the axis, the first member having a primary recess formed to the inside surface thereof;*

*a second planar member rotatable about the axis having an inside surface extending generally normal to the axis and disposed closely adjacent to the inside surface of the first member, the second member having at least one notch formed on the inside surface thereof;*

*a free-floating key disposed in the recess so as not to be physically secured to the first member, the key including a back end portion and a front end portion;*

*a biasing member carried by the first planar member urging the front end portion of the key into engagement with the inside surface of the second member; and*

*a retaining member fixedly secured to and rotatable with the first member, wherein a portion of the retaining member overlays only the back end portion of the key.*

*14. The apparatus of claim 13, wherein the inside surface of the first member includes a secondary recess opening into the primary recess, and wherein the retaining member is secured to the first member within the secondary recess.*

*15. The apparatus of claim 13, wherein the key includes a pair of laterally-extending arms operative to circumferentially stabilize the key within the recess upon rotation of the first member.*

* * * * *

UNITED STATES PATENT AND TRADEMARK OFFICE

CERTIFICATE OF CORRECTION

PATENT NO. : RE 38,498 E
DATED : April 20, 2004
INVENTOR(S) : Stephen M. Ruth et al.

It is certified that error appears in the above-identified patent and that said Letters Patent is hereby corrected as shown below:

Column 16,
Line 59, after “arm portion”, delete “key”.
Line 61, after “is” delete “in”,
Line 62, after “assembled”, delete “and”.

Column 18,
Line 27, delete “to” and insert -- in --.

Signed and Sealed this

Twenty-fourth Day of May, 2005

JON W. DUDAS
*Director of the United States Patent and Trademark Office*